United States Patent [19]

Weisman, II et al.

[11] Patent Number: 5,896,083
[45] Date of Patent: Apr. 20, 1999

[54] SYSTEM AND METHOD FOR DETECTING VEHICLE SPEED SENSOR TAMPERING

[75] Inventors: S. Miller Weisman, II, Farmington Hills; Richard Avery, West Bloomfield, both of Mich.

[73] Assignee: Detroit Diesel Corporation, Detroit, Mich.

[21] Appl. No.: 08/859,835

[22] Filed: May 16, 1997

[51] Int. Cl.$^6$ ........................................ B60Q 1/00
[52] U.S. Cl. ..................... 340/438; 340/439; 340/459; 180/173; 477/110
[58] Field of Search ........................ 340/438, 439, 340/441, 459, 461; 701/34; 324/161, 110; 180/170, 171, 173, 177; 477/109, 62

[56] References Cited

U.S. PATENT DOCUMENTS

| | | | |
|---|---|---|---|
| 4,866,616 | 9/1989 | Takeuchi et al. | 340/459 |
| 4,876,527 | 10/1989 | Oka et al. | 340/441 |
| 4,905,544 | 3/1990 | Gandung | 477/110 |
| 4,905,785 | 3/1990 | Kieffer et al. | 180/173 |
| 5,303,163 | 4/1994 | Ebaugh et al. | 340/439 |
| 5,371,487 | 12/1994 | Hoffman et al. | 340/425.5 |
| 5,430,432 | 7/1995 | Camhi et al. | 340/438 |
| 5,445,128 | 8/1995 | Letang et al. | 123/436 |
| 5,461,569 | 10/1995 | Hara et al. | 364/431.03 |
| 5,463,373 | 10/1995 | Widl et al. | 340/441 |
| 5,477,827 | 12/1995 | Weisman, II et al. | 123/436 |
| 5,586,130 | 12/1996 | Doyle | 340/439 |
| 5,706,199 | 1/1998 | Wilson et al. | 340/438 |

*Primary Examiner*—Daniel J. Wu
*Assistant Examiner*—John Tweel, Jr.
*Attorney, Agent, or Firm*—Brooks & Kushman P.C.

[57] ABSTRACT

A system and method for detecting tampering with a vehicle speed sensor input signal include determining a current gear ratio, comparing the current gear ratio to at least one reference gear ratio to determine a gear ratio difference value, and generating an error signal indicating tampering with the vehicle speed sensor signal when the gear ratio difference value exceeds a first threshold. In one embodiment the step of generating an error signal is performed only when the gear ratio difference value exceeds the first threshold for an elapsed time greater than a predetermined time period. One embodiment includes determining a current engine speed, current vehicle speed, and current transmission gear ratio and storing values for the current engine speed, vehicle speed, and transmission gear ratio in the memory whenever at least one predetermined criterion is satisfied. The system and method calculate difference values between the current engine speed, vehicle speed, and transmission gear ratio and corresponding previously stored respective values. A signal indicating tampering is generated when at least one of the difference values exceeds a corresponding threshold.

21 Claims, 4 Drawing Sheets

SYSTEM AND METHOD FOR DETECTING VEHICLE SPEED SENSOR TAMPERING

TECHNICAL FIELD

The present invention relates to a system and method for detecting tampering with a vehicle speed sensor.

BACKGROUND ART

Governors or limiters have been developed and utilized to manage various aspects of vehicle operation. Whether mechanical or electronic, governors are often used to limit one or more operating parameters to achieve a goal such as protecting vehicle components, maintaining safe vehicle operation, or improving operating efficiency. For example, an engine speed limiter or governor may impose an upper limit on engine speed to prevent damage to various engine or vehicle components. A vehicle speed or road speed limiter may impose an upper limit on the ground speed of the vehicle in an attempt to restrict unsafe operation of the vehicle.

A road speed (or vehicle speed) limiter may also be used in commercial vehicles, such as MVMA Class 7 and Class 8 vehicles, to reduce the adverse impact of increased speed on fuel economy. Such vehicles typically have significant aerodynamic drag which increases as a cubic function of vehicle speed. As such, fleet operators attempt to reduce operating costs by balancing the complementary factors of trip time and fuel consumption by imposing a road speed limit on vehicle operators. However, many vehicle drivers have objectives different from those of the fleet operators. As such, drivers may attempt to defeat or bypass various governors in an effort to increase vehicle power and/or speed, and thereby decrease trip time at the expense of fuel consumption.

Tampering with the vehicle speed sensor has become a significant issue with many on-highway vehicle fleets. Current engine or powertrain controllers employ various methods to detect a shorted or open vehicle speed sensor (VSS) circuit. For example, a malfunction code may be generated when the pulse width of the fuel signal is greater than a calibratable number of degrees, engine speed is greater than a calibratable RPM, and measured vehicle speed is less than a calibratable limit for a predetermined amount of time. When such a failure is detected, precautionary measures may be employed such as limiting the rated engine speed to the equivalent RPM for the road speed limit value in the highest or top gear (lowest input to output gear ratio). To avoid triggering a fault condition by disconnecting the VSS, drivers may connect a fixed frequency oscillator such as those utilized in dimmer controls to defeat the vehicle or road speed limiter. An artificial speed sensor signal having a fixed frequency, or a frequency which is based on engine speed may result in the vehicle controller calculating an artificially low vehicle speed thereby allowing high speed operation with commensurate poor fuel economy and possibility of unsafe operation.

DISCLOSURE OF THE INVENTION

It is thus a general object of the present invention to provide a system and method for detecting tampering with a vehicle speed sensor.

A further object of the present invention is to provide a system and method for detecting a fixed frequency signal supplied to the vehicle speed sensor input of an engine controller.

Another object of the present invention is to provide a system and method for detecting a signal supplied to a vehicle speed sensor input of a vehicle controller which has a frequency dependent upon engine speed.

An additional object of the present invention is to provide a system and method for detecting tampering with a vehicle speed sensor input by monitoring gear ratio of the vehicle.

In carrying out the above objects and other objects, features, and advantages of the present invention, a system and method for detecting an attempt to defeat a vehicle speed governor are disclosed. In one embodiment of the present invention, the system and method monitor a virtual gear ratio calculated using signals indicative of engine speed and vehicle speed. The system and method detect tampering with a vehicle speed sensor input signal by determining a current gear ratio and comparing the current gear ratio to at least one reference gear ratio to determine a gear ratio difference value. An error signal indicative of tampering with the vehicle speed sensor signal is generated when the gear ratio difference value exceeds a first threshold. The stored reference value for the gear ratio is updated whenever at least one predetermined criterion is satisfied.

The present invention provides a number of advantages in addressing various problems associated with prior art systems and methods. For example, the present invention detects the substitution of a fixed frequency oscillator for the vehicle speed sensor input signal. The present invention provides a number of detection criteria to identify tampering while reducing or eliminating false indications resulting from normal operation.

The above advantages and other advantages, objects, and features of the present invention will be readily apparent from the following detailed description of the best mode for carrying out the invention when taken in connection with the accompanying drawings.

DETAILED DESCRIPTION OF THE INVENTION

Figure 1:
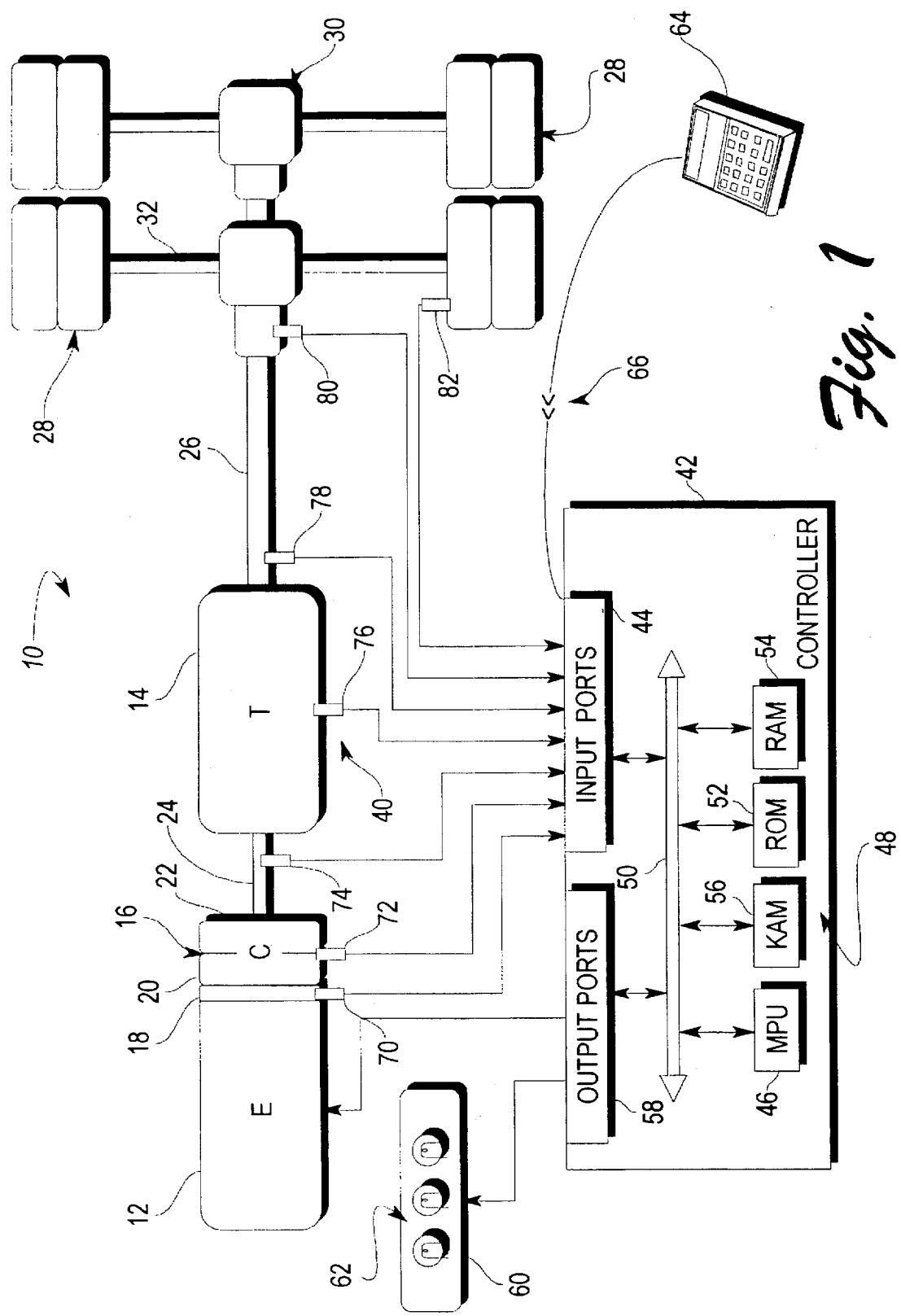
FIG. 1 is a block diagram illustrating a system for detecting tampering with a vehicle speed sensor signal according to the present invention.

Referring now to FIG. 1, a block diagram illustrating a system and method for detecting tampering with a vehicle speed sensor input signal according to the present invention are shown. The system is particularly suited for use in a vehicle, indicated generally by reference numeral 10, which includes an engine 12 coupled to a transmission 14 via a master friction clutch 16. In a preferred embodiment, engine 12 is a compression-ignition internal combustion engine, such as a four-cylinder or six-cylinder diesel engine. Transmission 14 is preferably a multiple gear ratio transmission which is manually or semi-automatically actuated to select one of the available gear ratios. Engine 12 includes a flywheel 18 which is bolted to a driving portion 20 of master friction clutch 16. Driving portion 20 is selectively engaged to driven portion 22 to drive input shaft 24 of transmission 14. Master friction clutch 16 may be manually or automatically controlled by a clutch actuator (not specifically illustrated) as is well known in the art.

Transmission 14 operates to selectively couple input shaft 24 to output shaft 26 to provide various input-to-output (or gear) ratios. As used herein, a higher gear refers to a lower gear ratio and vice versa. For example, a second gear having a representative gear ratio of 15:1 (transmission input speed to output speed) would be higher than a first gear having a representative gear ratio of 18:1. Output shaft 26 may be coupled to one or more sets of wheels 28 via conventional differentials 30 and transaxles 32.

Vehicle 10 may also include various sensors 40 for generating signals indicative of corresponding operational conditions or parameters of engine 12, transmission 14, clutch 16, and the like. Sensors 40 are in electrical communication with a controller 42 via input ports 44. Controller 42 preferably includes a microprocessor 46 in communication with various computer readable storage media 48 via data and control bus 50. Computer readable storage media 48 may include any of a number of known devices which function as a read-only memory (ROM), random access memory (RAM) 54, keep-alive memory (KAM) 56, and the like. The computer readable storage media may be implemented by any of a number of known physical devices capable of storing data representing instructions executable via a computer such as controller 42. Known devices may include but are not limited to PROMs, EPROMs, EEPROMs, flash memory, and the like in addition to magnetic, optical and combination media capable of temporary or permanent data storage.

Computer readable storage media 48 include various program instructions, software, and control logic to effect control of various systems and sub-systems of vehicle 10, such as engine 12, transmission 14, and the like. Controller 42 receives signals from sensors 40 via input ports 44 and generates output signals which may be provided to various actuators and/or components via output ports 48. Signals may also be provided to a display device 60 which includes various indicators such as lights 62 to communicate information relative to system operation to the operator of the vehicle. Preferably, display 60 includes at least one illuminated indicator such as a check engine light to alert the operator to a malfunction or error. Display 60 may also include an alphanumeric portion or other suitable operator interface to provide status information to a vehicle operator or technician. As such, display 60 represents one or more displays or indicators which may be located throughout the vehicle interior and exterior but is preferably located in the cab or interior of the vehicle. A data, diagnostics, and programming interface 64 may also be selectively connected to controller 42 via a plug 66 to exchange various information therebetween. Interface 64 may be used to change values within the computer readable storage media 48, such as configuration settings, calibration variables, control logic and the like.

Sensors 40 preferably include an engine speed sensor 70. Engine speed may be detected using any of a number of known sensors which provide signals indicative of rotational speed for flywheel 18, or various internal engine components such as the crankshaft, camshaft, or the like. In a preferred embodiment, engine speed is determined using a timing reference signal generated by a multi-tooth wheel coupled to the camshaft.

A clutch sensor 72 may be provided to determine the clutch slip or engagement position of master friction clutch 16. An input shaft speed sensor 74 may be provided to determine the input speed of transmission 14. As will be appreciated by one of ordinary skill in the art, most vehicle applications will neither require nor utilize all of the sensors illustrated in FIG. 1. As such, it will be appreciated that the objects, features, and advantages of the present invention are independent of the particular manner in which the operating parameters are sensed.

With continuing reference to FIG. 1, a transmission sensor 76 may be used to detect the currently selected transmission gear ratio. Alternatively, sensor 76 may be a neutral gear switch which provides a signal when transmission 14 is in neutral. In a preferred embodiment of the present invention a virtual gear ratio is determined based on the transmission input speed and output speed. Appropriate scaling factors are used to compensate for the differential or final drive ratio and wheel size to determine the vehicle speed. A virtual gear ratio may be used in vehicles which do not directly sense the currently engaged transmission gear ratio or may be used in combination with a gear ratio indicator by comparing the virtual gear ratio to the gear ratio indicated by an appropriate transmission sensor. Variation between the VGR and the sensed ratio may then trigger a fault condition.

An output shaft sensor 78 may be provided to detect the rotational speed of output shaft 26. A differential sensor 80 may be provided to determine the selected differential ratio for vehicles equipped with multiple-ratio differentials. Wheel speed sensors, such as sensor 82, may be used to provide an indication of the current wheel speed of one or more vehicle wheels. Such sensors are commonly used in traction control systems (TCS) and anti-lock braking systems (ABS). Of course, one or more sensors may provide signals to various other controllers which are eventually communicated to controller 42 rather than being directly connected via input ports 44 as illustrated in FIG. 1.

In operation, controller 42 receives signals from sensors 40 and executes control logic embedded in hardware and/or software to detect tampering with a vehicle speed sensor input signal by determining a current gear ratio, comparing the current gear ratio to at least one reference gear ratio to determine a gear ratio difference value, and generates a signal indicating tampering with the vehicle speed sensor signal when the gear ratio difference value exceeds a corresponding threshold. The generated signal may be used to log a fault in the controller and provide an indication to the operator, such as illumination of the check engine light. The vehicle speed sensor signal may be one or more of the signals provided by sensors 40 but is preferably a signal indicative of transmission output shaft (prop shaft) or wheel speed. In a preferred embodiment, controller 42 is the DDEC III controller available from Detroit Diesel Corporation in Detroit, Mich. Various other features of this controller are described in detail in U.S. Pat. Nos. 5,477,827 and 5,445,128, the disclosures of which are hereby incorporated by reference in their entirety.

Figure 2:
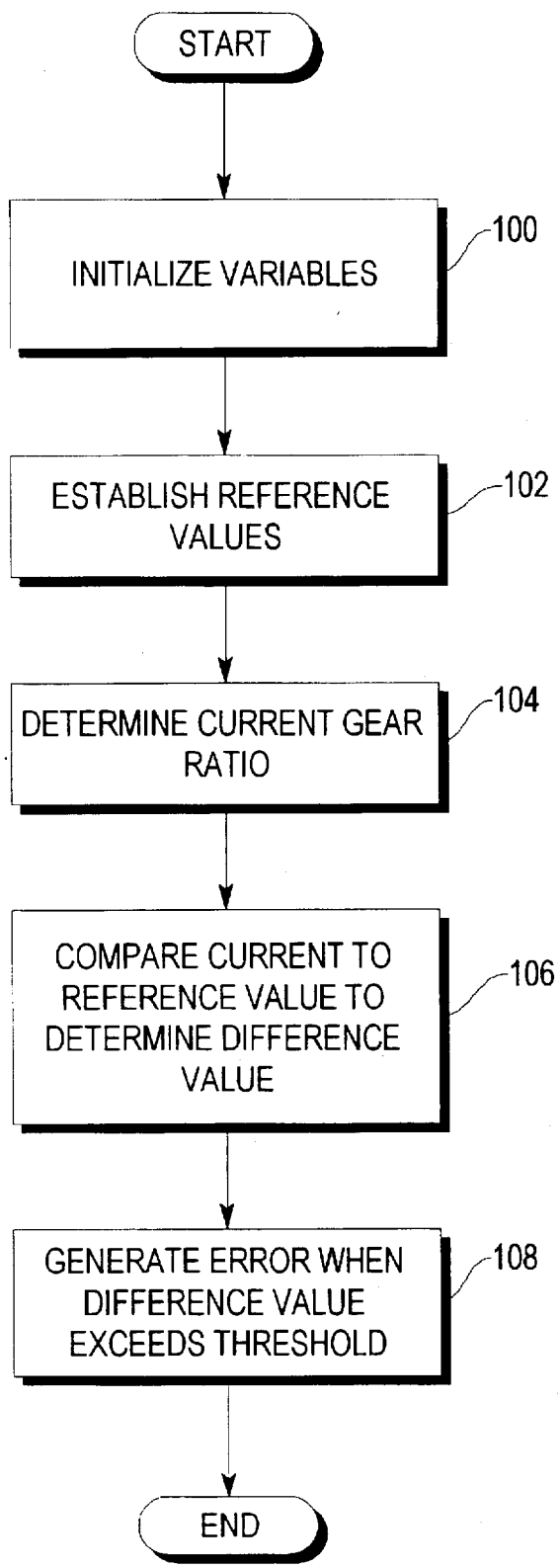
FIGS. 2–4 are flow diagrams illustrating representative control logic for practicing a method for detecting tampering with a vehicle speed sensor signal according to the present invention.
Figure 3:
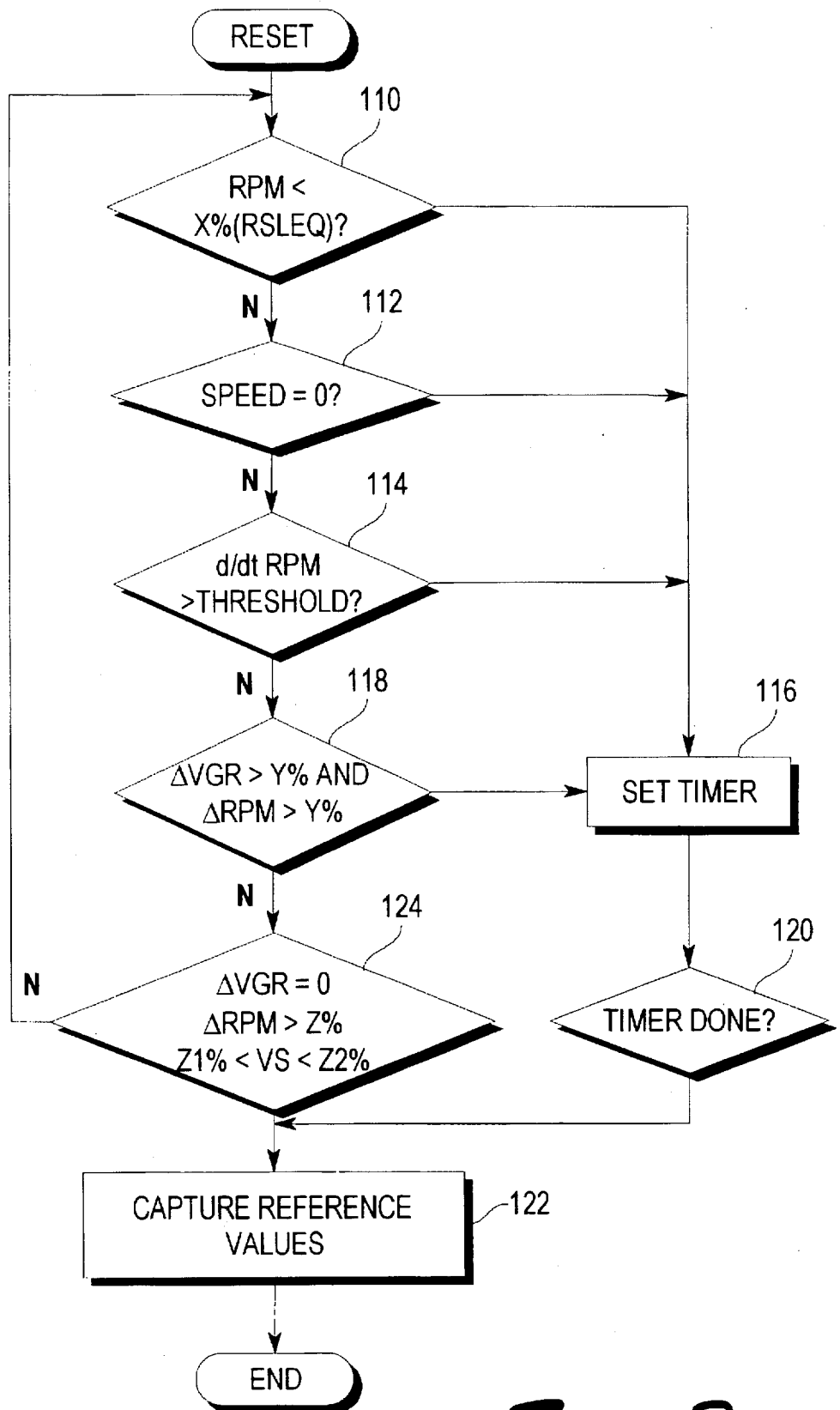
Figure 4:
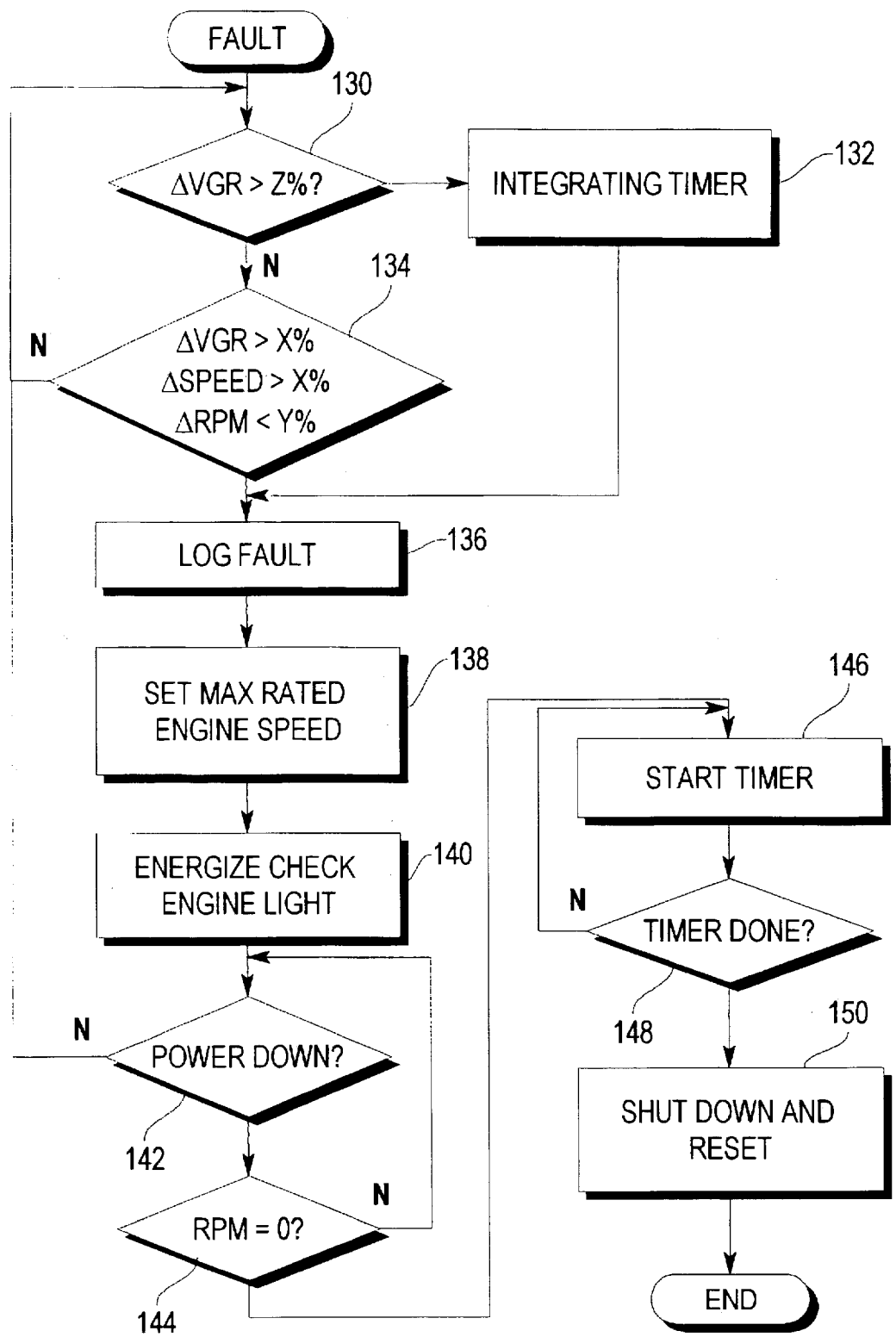

Referring now to FIGS. 2 through 4, flow charts illustrating representative control logic of a system and method for detecting tampering with a vehicle speed sensor input signal according to the present invention are shown. As will be appreciated by one of ordinary skill in the art, the control logic may be implemented or effected in hardware, software, or a combination of hardware and software. The various functions are preferably effected by a programmed microprocessor, such as the DDEC III controller, but may include one or more functions implemented by dedicated electric, electronic, and integrated circuits. As will also be appreciated, the control logic may be implemented using any of a number of known programming and processing techniques or strategies and is not limited to the order or sequence illustrated here for convenience only. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Block 100 of FIG. 2 represents initialization of various programming variables and thresholds, one or more of which may be determined during initialization or reprogramming of the system. Other values may be retrieved from a non-volatile memory or computer readable storage media upon engine start-up or other event such as detection of a fault or error. Reference values are determined and stored in memory as represented by block 102. Reference values preferably include gear ratio, vehicle speed, and engine speed (RPM). The gear ratio may be communicated by a transmission controller but is preferably a virtual gear ratio (VGR) which may be determined using the ratio of transmission input to output speed. One of ordinary skill in the art will recognize a number of methods to determine transmission input and output speeds which may be directly sensed or indirectly inferred from various other sensed parameters. The reference values determined by block 102 are periodically reset or captured (and stored) based on occurrence of one or more predetermined events. In a preferred embodiment, a four second capture timer is reset upon the occurrence of predetermined conditions to reset the reference values which are established based on filtered values during the four second capture window as explained in greater detail below.

Current operating parameters including at least the current gear ratio are determined as represented by block 104 of FIG. 2. Preferably, current filtered values for the virtual gear ratio, vehicle speed, and engine speed are determined. The current values are compared to the corresponding previously stored reference values to determine corresponding difference values as represented by block 106. An error or fault signal is generated when one or more of the difference values exceed a corresponding threshold value as represented by block 108.

For example, in one embodiment of the present invention, filtered values for engine speed, vehicle speed, and VGR are filtered at 25 milliseconds using a filter constant of 0.1. The filtered difference value for engine speed uses a filter constant of 0.05. Various conditions may trigger a capture timer which allows modification of the reference values based on the filtered values during the elapsed capture time, preferably four seconds in length. Difference values between the current value and the captured reference value are determined as a percentage change from the captured reference points. A fault or error is immediately logged, the check engine lamp is illuminated, and the rated (maximum allowed) engine speed is set to the road (vehicle) speed limit equivalent RPM when the change in VGR exceeds 15%. These actions are also performed when the change in VGR exceeds 5% for a predetermined time period which may be measured using a 2 second integrating timer, for example. One type of integrating timer measures the elapsed time by accumulating total time elapsed during which the gear ratio difference value exceeds the corresponding threshold. The integrating timer may also subtract time elapsed from accumulated time during which the gear ratio difference value does not exceed the corresponding threshold. Alternatively, the timer may be reset to zero when the gear ratio difference value drops below the corresponding threshold.

Referring now to FIG. 3, a flow diagram illustrating control logic for resetting captured reference values for monitored parameters according to the present invention is shown. Again, the particular order of operations illustrated is for convenience only. Preferably, one or more of the computations/decisions illustrated are made essentially concurrently and do not depend on the result of other operations except where necessary as will be recognized by one of ordinary skill in the art. Reference values are captured (stored) for at least the gear ratio (or VGR) and preferably the vehicle speed and engine speed upon the occurrence of the conditions illustrated in FIG. 3.

The engine speed difference value ($\Delta$RPM) is compared to a calibratable fraction or percentage (x%) of the engine speed corresponding to the road speed limit value ($RSL_{EQ}$) when the vehicle is in the highest gear. This condition resets the capture points any time the engine speed is well below the engine speed corresponding to the road speed limit. In a preferred embodiment, this condition is triggered when the engine speed falls below 85% of the engine speed corresponding to the road speed limit. This engine speed is determined based on various vehicle parameters such as wheel size, axle differential ratio, top gear ratio, and the like. This condition improves robustness by reducing false codes while detecting tampering as soon as possible before the vehicle exceeds the programmed road speed limit.

Block 112 of FIG. 3 effects resetting of the capture timer when the detected vehicle speed is substantially zero. This condition helps reduce false triggers when the vehicle is not moving. In a preferred embodiment of the present invention, control logic used to detect an open or short circuit in the vehicle speed sensor is used to detect a zero vehicle speed condition fault. As such, the vehicle speed tampering logic need not address this condition. If the rate of change of engine speed exceeds a corresponding threshold, such as 400 RPM per second, block 114 resets the reference value capture timer as indicated by block 116. This condition is used to reset the reference values when the engine speed is changing at a rate which may indicate that the transmission is in neutral or the master friction clutch is disengaged, i.e not transmission torque such as when the clutch pedal is depressed. This may also effect a reset of the captured reference values while the transmission is in lower gears for some vehicles because the rate of change of engine speed is relatively high in such vehicles.

Block 118 of FIG. 3 determines whether the change in gear ratio ($\Delta$VGR) and the change in engine speed ($\Delta$RPM) exceed corresponding thresholds which are preferably 15% higher than the previously stored reference values. This condition indicates that the transmission may be in neutral or the clutch disengaged. This reduces false tampering indications when the transmission is in neutral but the engine speed is not changing at a rate fast enough to trigger the condition represented by block 114. The check performed by block 118 will generally cause a reference value reset or recapture when the vehicle is in a tire skid or wheel spin condition.

A capture timer is initialized as represented by block 116 when any of the conditions of blocks 110, 112, 114, or 118 is satisfied. Block 120 increments the timer while the triggering condition(s) is(are) satisfied. Preferably, a four second capture timer is utilized. The current filtered values for gear ratio (or virtual gear ratio), vehicle speed, and engine speed will be stored in memory as the captured reference values as represented by block 122 when the capture timer expires as determined by block 120. As illustrated in FIG. 3, the conditions of block 124 trigger an immediate recapture of the reference values without regard to the elapsed time. The conditions of block 124 require that there be no change in VGR, an engine speed difference value exceeding a corresponding threshold, vehicle speed exceeding a corresponding threshold, and the engine speed difference and vehicle speed difference (properly scaled) are equal. This condition indicates that the vehicle speed sensor is operating as expected. Specifically, the VGR should not change when the vehicle speed sensor is working properly and the transmission is in gear. However, the vehicle speed and engine speed are expected to change but the changes should track each other. The conditions of block 124 help to reduce false codes by keeping the captured reference values close to the current operating values for the vehicle speed and engine speed.

Referring now to FIG. 4, a flow diagram illustrating conditions for indicating a vehicle speed sensor signal tampering fault according to the present invention is shown. As represented by block 130, when the difference value for VGR is within a predetermined range of, for example, 5% to 15%, a timer is started as represented by block 132. Preferably, timer 132 is an integrating timer as described above with a set value of two seconds. When the timer reaches its preset value, a fault is logged in memory as indicated by block 136. A VGR difference value within such a predetermined range indicates that a fixed frequency tampering device may be connected to the vehicle speed sensor input since the VGR should not be changing while the vehicle is in gear. Alternatively, the VGR could be compared to a table of known acceptable or available gear ratios. A fault would be indicated if the VGR was not within a predetermined tolerance range of the known acceptable gear ratios. The various capture reset events attempt to trigger a fault only when the vehicle is in gear.

With continuing reference to FIG. 4, block 134 monitors the difference values to determine whether the change in VGR is greater than a corresponding threshold, such as 15%, and the VGR difference value resulted from a change in vehicle speed larger than that threshold (15% in this example) with a corresponding small change in engine speed, i.e. one which does not trigger a capture reset event as described above. This situation may occur when a fixed frequency tampering device is first connected or turned on and replaces the vehicle speed sensor signal. As illustrated in FIG 4, this condition immediately logs a fault without regard to elapsed time.

The fault is logged or stored in memory as represented by block 136. The rated (maximum allowable) engine speed is then set to an engine speed corresponding to the programmed road speed limit as represented by block 138. This effectively defeats the attempt to tamper with the vehicle speed sensor signal by providing road speed limiting using engine speed limiting. A fault or error signal is generated to provide the vehicle operator with an indication of the fault. Preferably, this includes illuminating the check engine light and may also include an alphanumeric or graphical indication in some vehicles.

The fault remains active until the controller is powered down and automatically reset. To circumvent attempts to reset the fault while the vehicle is in motion, the present invention utilizes a power down timer as represented by blocks 142 through 150. Block 142 is activated when the ignition switch (not specifically illustrated) is turned to the off position. Engine speed is monitored as represented by block 144. Once engine speed reaches zero, a timer is started as indicated by block 146. The fault remains active until the timer expires and the controller shuts down and is reset as represented by blocks 148 and 150. In a preferred embodiment, the timer is set to a value of 25 seconds. This feature discourages drivers from cycling the ignition to clear the fault while the vehicle is moving. In addition, cycling of the ignition will not reset the capture timer while at or above the road speed limit. To accommodate bench testing and dynamometer cell testing, another timer may be employed to delay the VSS tampering detection for predetermined period of time, such as five hours of engine running time.

While it may still be possible to avoid detection of a tampering fault under certain circumstances, the variety of detection techniques of the present invention reduce the likelihood of any operator manipulation of the monitored parameters going undetected. Similarly, the present invention reduces occurrences of false codes being logged by resetting the reference values based on engine speed rate of change, VGR changes, and lower engine speed values.

While the best mode contemplated for carrying out the invention has been described in detail, those familiar with the art to which this invention relates will recognize various alternative designs and embodiments for practicing the invention as defined by the following claims.

What is claimed is:

1. A method for detecting tampering with a vehicle speed sensor, the method comprising:

determining a current gear ratio;

comparing the current gear ratio to at least one reference gear ratio to determine a gear ratio difference value;

generating an error signal indicating tampering with the vehicle speed sensor when the gear ratio difference value exceeds a first threshold value for a predetermined period of time; and generating the error signal if the gear ratio difference value exceeds a second threshold without regard to elapsed time, the second threshold being greater than the first threshold.

2. The method of claim 1 further comprising:

measuring elapsed time by accumulating time elapsed during which the gear ratio difference value exceeds the first threshold; and subtracting time elapsed from accumulated time during which the gear ratio difference value does not exceed the first threshold.

3. The method of claim 1 further comprising:

measuring elapsed time by accumulating time elapsed during which the gear ratio difference value exceeds the first threshold; and resetting elapsed time upon occurrence of at least one predetermined event.

4. The method of claim 3 wherein the at least one predetermined event includes the gear ratio difference value being less than the first threshold.

5. The method of claim 1 wherein the step of determining the current gear ratio comprises:

determining current engine speed; and determining current vehicle speed, wherein the current vehicle speed is based on the vehicle speed sensor input signal.

6. The method of claim 1 further comprising dynamically determining the at least one reference gear ratio during operation wherein determination of the at least one reference gear ratio is triggered by occurrence of a predetermined event.

7. The method of claim 6 further comprising resetting the reference gear ratio any time engine speed is below a predetermined fraction of an engine speed limit wherein the engine speed limit corresponds to the engine speed associated with a predetermined vehicle speed limit.

8. The method of claim 6 further comprising resetting the reference gear ratio any time the vehicle speed sensor input signal indicates a vehicle speed less than a predetermined vehicle speed.

9. The method of claim 6 further comprising resetting the reference gear ratio any time engine speed changes at a rate greater than a threshold engine acceleration.

10. The method of claim 6 further comprising resetting the reference gear ratio when a neutral gear is detected.

11. The method of claim 6 further comprising resetting the reference gear ratio in response to a vehicle clutch being depressed.

12. A method of detecting tampering which affects a vehicle speed sensor signal, the method comprising:

determining a current gear ratio;

comparing the current gear ratio to at least one reference gear ratio to determine a gear ratio difference value;

monitoring current engine speed relative to a reference engine speed to determine an engine speed difference value;

resetting the reference gear ratio and the reference engine speed when the gear ratio difference value exceeds a second threshold and the engine speed difference value exceeds a corresponding threshold; and generating an error signal indicating tampering with the vehicle speed sensor signal when the gear ratio difference value exceeds a first threshold.

13. A method of detecting tampering affecting a vehicle speed sensor input signal, the method comprising:

determining a current gear ratio;

comparing the current gear ratio to at least one reference gear ratio to determine a gear ratio difference value;

monitoring current engine speed relative to a reference engine speed to determine an engine speed difference value;

resetting the reference gear ratio and the reference engine speed when the gear ratio difference value approaches zero, the engine speed difference value exceeds a second corresponding threshold, the vehicle speed difference exceeds a corresponding threshold, and the vehicle speed difference value is approximately equal to the engine speed difference value, wherein the vehicle speed difference value and the engine speed difference value are measured as a percentage of the engine speed reference and the vehicle speed reference, respectively; and generating an error signal indicating tampering with the vehicle speed sensor signal when the gear ratio difference value exceeds a first threshold.

14. A method for detecting tampering with a speed sensor input signal in a vehicle having an engine and a multiple gear ratio transmission, the vehicle also including a vehicle speed sensor for generating a signal indicative of road speed of the vehicle and an engine speed sensor for generating a signal indicative of speed of the engine, the engine speed sensor and the vehicle speed sensor being in communication with a controller having a memory, the method comprising:

determining a current engine speed, current vehicle speed, and current transmission gear ratio;

storing values for the current engine speed, the current vehicle speed, and the current transmission gear ratio in the memory whenever at least one predetermined criterion is satisfied;

calculating difference values between the current engine speed, the current vehicle speed, the current transmission gear ratio and corresponding previously stored values for the engine speed, vehicle speed, and transmission ratio, respectively;

generating an error signal indicating tampering with the vehicle speed sensor when at least one of the difference values exceeds a first threshold value for a predetermined period of time; and generating the error signal if at least one of the difference values exceeds a second threshold without regard to elapsed time, the second threshold being greater than the first threshold.

15. The method of claim 14 wherein the at least one predetermined criterion comprises engine speed being below a predetermined percentage of an engine speed corresponding to a road speed limit in a lowest available gear ratio corresponding to a highest available gear of the transmission.

16. The method of claim 14 wherein the at least one predetermined criterion comprises vehicle speed determined from the signal provided by the vehicle speed sensor being substantially zero.

17. The method of claim 14 wherein the step of generating a signal indicating tampering comprises generating a signal indicating tampering when the difference value corresponding to the gear ratio exceeds a predetermined percentage of the stored gear ratio value.

18. A computer readable storage medium having data stored therein, the data representing instructions executable by a computer to detect tampering with a vehicle speed sensor signal input to the computer, the computer readable storage medium comprising:

instructions for determining a current engine speed, current vehicle speed, and current transmission gear ratio based on associated signals;

instructions for storing values for the current engine speed, the current vehicle speed, and the current transmission gear ratio in the memory, the values being stored whenever at least one predetermined criterion is satisfied;

instructions for calculating difference values between the current engine speed, the current vehicle speed, the current transmission gear ratio and corresponding previously stored values for the engine speed, vehicle speed, and transmission gear ratio, respectively;

instructions for generating an error signal indicating tampering with the vehicle speed sensor when the gear ratio difference value exceeds a first threshold value for a predetermined period of time; and instructions for generating the error signal if the gear ratio difference value exceeds a second threshold without regard to elapsed time, the second threshold being greater than the first threshold.

19. A system for detecting tampering with a vehicle speed sensor input signal, the system comprising:

a vehicle speed sensor for providing a signal indicative of vehicle speed;

an engine speed sensor for generating a signal indicative of engine rotational speed; and control logic in communication with the vehicle speed sensor and the engine speed sensor for determining a current transmission gear ratio based on the vehicle speed sensor, comparing the current transmission gear ratio to at least one reference gear ratio to determine a gear ratio difference value, generating an error signal indicating tampering with the vehicle speed sensor when the gear ratio difference value exceeds a first threshold value for a predetermined period of time, and generating the error signal if the gear ratio difference value exceeds a second threshold without regard to elapsed time, the second threshold being greater than the first threshold.

20. The system of claim 19 further comprising control logic for measuring elapsed time by accumulating total time elapsed during which the gear ratio difference value exceeds the first threshold.

21. The system of claim 19 further comprising control logic for measuring elapsed time by accumulating time elapsed during which the gear ratio difference value exceeds the first threshold and subtracting time elapsed from accumulated time during which the gear ratio difference value does not exceed the reference value.

* * * * *